Sept. 21, 1937.   G. WIDMER ET AL   2,093,652
MOLDED MATERIAL AND PROCESS OF MAKING SAME
Filed June 3, 1935
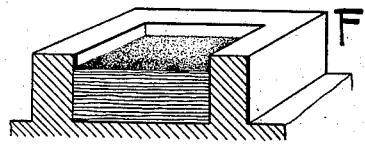
Fig.1.
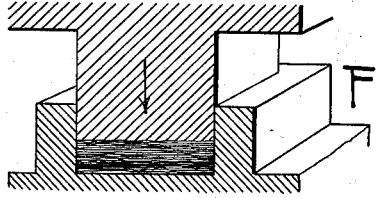
Fig.2.
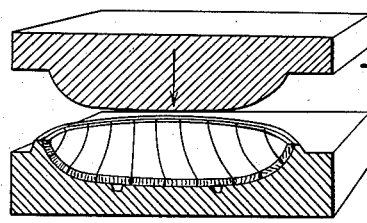
Fig.7.
Fig.3.
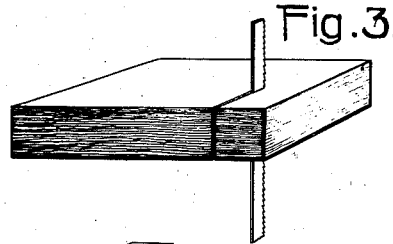
Fig.8.
Fig.4.
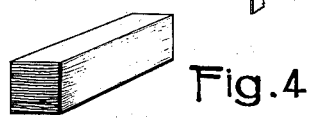
Fig.9.
Fig.5.
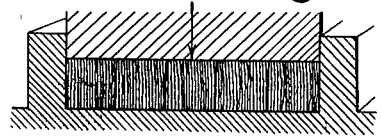
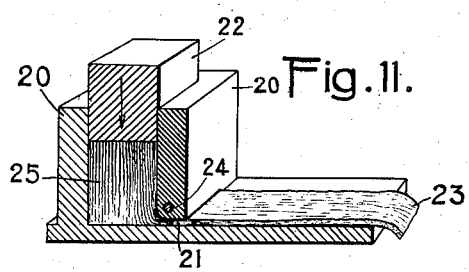
Fig.10.
Fig.11.
Fig.6.
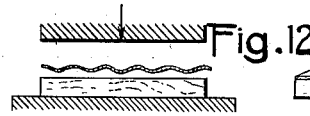
Fig.12.
Fig.13.
Fig.14.   Fig.16.   Fig.17.
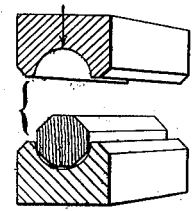   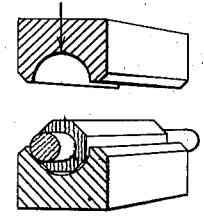   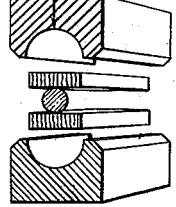
Fig.15.   Fig.18.
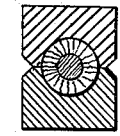
Inventors:
G. Widmer & A. Guehli,
By C. F. Wenderoth
Atty Patented Sept. 21, 1937

2,093,652

UNITED STATES PATENT OFFICE 2,093,652

MOLDED MATERIAL AND PROCESS OF MAKING SAME

Gustave Widmer and Alfred Juchli, Basel, Switzerland, assignors to firm of Society of Chemical Industry in Basle, Basel, Switzerland Application June 3, 1935, Serial No. 24,770
In Switzerland June 8, 1934

1 Claim. (Cl. 18—48.8)

This invention relates to the manufacture of molded material on the basis of synthetic resin molding powders and especially the manufacture of irregularly patterned molded bodies on such basis.

Thermo-plastic artificial materials, for instance celluloid products, have been made which have a striped, marbled or mottled appearance. The production of plates having colored stripes from hardened artificial resin is also known. For example, sheets of different colored papers impregnated with carbamide resin have been laid one upon the other, the whole hot pressed for a short time and the plate thus obtained has been sawn transversely. The strips produced have then been turned through an angle of 90° and laid side by side, the plate thus formed being finished by hot pressing. The products thus obtained have in general a uniformly striped or other pattern and in consequence are not suitable for imitation of marble or other natural stones, such as onyx, or for obtaining specially desired bleeding effects, such as are up to now produced by the casting method, for instance with cast phenol resins.

It is further known to produce tubes, rods, sheets, and the like, by the method of extruding plastic material, if desired, in different colors, through a heated nozzle. The decorative effects obtained according to this method are of mottled and grained appearance and it is not possible to produce stratified products therewith.

The present invention relates to a method of producing such irregular so-called bleeding effects of stripy or mottled character in a very simple manner from the known molding powders and particularly the modern carbamide-resin molding powders. It has already been proposed to produce a marble effect with these molding powders by incomplete mixing of various colored powders before the molding operation, but by the usual method of marbling the layers are necessarily always substantially parallel to the surface so that the production of material in which the stratification is perpendicular or inclined to the surface is impossible.

According to the present invention this difficulty has been overcome by working in the following manner:—

The molding powders are arranged in horizontal layers substantially parallel (Fig. 1) and then fixed in this position by a cold pressing or a short hot pressing operation (Fig. 2), whereupon the tablets or preforms thus obtained are sawn into strips of desired thickness at any desired angle to the layers. (Fig. 3.) By this cutting operation the designs are intersected at an angle. The pieces thus obtained (Fig. 4) are then rearranged in a manner different to their original position and subjected to a hot pressing operation to obtain a finished product. For instance the strips obtained are placed side by side with the saw cut surfaces directed upwards and downwards and hot pressed in known manner (Fig. 5). In this manner plates, in particular, can be made, which have a very beautiful appearance (Fig. 6) similar to that of marble, onyx or the like, cut transversely or obliquely to the stratification and polished. Also eye-spotted or irregular mottled decorations may easily be produced which are remarkable in their similarity to those of natural products, such as cut stone or wood, because the edges are not sharply defined but, owing to the use of loose powder, have the correct degree of bleeding and lack of sharpness.

The oblique sawing of such stratified plates produces comparatively much waste material, which is not the case with transverse sawing, that is to say perpendicularly to the stratification. Therefore, for the production of molded bodies whose stratification runs obliquely the following process may be used with advantage:—Instead of building up the various colored molding powders in layers which are substantially horizontal, they are built up in irregularly oblique layers by beginning to build up on one side of the mold and, while maintaining the same angle, finally ending on the opposite side of the mold. After pressing, hot or cold, the tablets produced show oblique stratification. These tablets may be sawn perpendicularly or parallel to the bottom surface without waste to produce plates or sheets in which all the layers have been cut obliquely. These plates or sheets can, either singly or loosely placed beside one another, be pressed into very beautiful products in which all marbling layers are cut obliquely. Preferably before making the plates or sheets, the outermost layer of the bottom or surface of the tablet is removed by planing or sawing in order to avoid too indistinct patterns.

While, therefore, the products made from variously colored molding powders by the known process of direct marbling exhibit stratification substantially parallel to the surfaces of the pressed or molded product, the indirect method of marbling of the present invention allows to produce molded products, the stratification of which runs at any desired angle to the surface.

The process according to the invention is chiefly applicable for producing material in the form of plates, such as table tops, wall panels and useful objects made from such plates. As compared with the corresponding natural products, for example marble, the products of the invention have greater mechanical strength and are warmer to the touch. As compared with corresponding artificial products, for instance cast phenol-resin imitations, they have the advantage that they are cheaper to make and have a still better mechanical strength.

The invention is not, however, limited to the manufacture of plates, but may be applied with obvious modifications to the manufacture of rods and tubes and so on. For this purpose the above-described cold-molded tablets are sawn into 4-sided rods (Figs. 3 and 4) which are turned cylindrical, or better cut, or at least sawn into approximately cylindrical form (Fig. 14) and then hot-pressed in known manner to form rods (Fig. 15). It is also possible to turn or bore an axial hole through such a marbled rod and by pulling it on a suitable mandrel to mold it into the form of a tube (Fig. 16). Tubes can also be made by laying strips of tablet of the breadth of the half-cylinder circumference around a hot mandrel and hot-pressing it (Figs. 17 and 18). The rods and tubes thus obtained, like the plates, exhibit a surface with stratifications which are cut at a desired angle.

This new manufacture can be applied also to the production of other molded objects, particularly bowls and flat arched objects, whereas molded objects of considerable height or objects having steep walls present more difficulty. As already described a stratified tablet is first produced and is then sawn (Figs. 1–4). If the tablet is of such size that its sawn section is large enough for the object to be molded this section is cautiously pressed hot into the mold. Disintegration of the plate must obviously be avoided, either by pre-heating it until it is in a plastic condition or by cautious heating of the mold itself, so as to soften it before the mold is finally closed. However, if the tablet is cracked, there may also be produced very pretty effects, provided that the comminution by the cracking has not gone too far.

If the sawn pieces of the marbled tablets are laid in the form of strips they can first be combined to a plate of sufficient size before they are brought into the mold. For this purpose they are laid side by side so that the directions of stratification are not parallel to the new surfaces and then the whole is subjected to a short hot-pressing whereby the strips are welded together. This new plate is laid, preferably while hot, in the heated mold for the bowl or the like and immediately pressed. The strips may also be laid side by side in the open heated mold, whereby they become soft and take the form of the curved wall of the mold (Fig. 7). The press is then closed and the molding finished as usual. In this manner there are obtained, for example, very beautiful molded articles of alabaster appearance, for instance large bowls (Fig. 8) useful as fruit bowls, or such as are used in the lighting industry.

For mass production, the sawn pieces of the tablets, preferably preheated, may be passed between heated rollers which may have a lateral boundary. Thus the pieces are further compressed and the several strips welded together with retention of the desired design. The hot sheets thus produced may either be immediately further molded without trouble, as in the case of any preheated tablet, or be stored in an enclosed space and molded later. Such sheets (Fig. 9) are suitable for surfacing any supporting material. For example, they may be pressed on to asbestos cement plates, producing extraordinarily beautiful marbling effects (Fig. 10). Such products are suitable, for example, as fire-proof wall panelling, table tops and the like.

Thin sheets suitable for pressing upon other supports may be made by the following process, particularly for obtaining striped effects wherein the colors are transversally embedded in the surface sheet:—A tablet is made as first described above, the layers of which run substantially parallel to the surface and which, as to coloring, sequence and thickness of layers, correspond with the desired pattern (Figs. 1–3). From this striped tablet pieces are sawn by transversal cuts which are preferably square to rectangular (Fig. 4) so that they fit into a press (20) (Fig. 11), in the bottom of which is an extrusion slot (21). If now the press is gradually heated from below while pressure is applied to the plunger of the press (22) there is extruded through the slot a ribbon (23) which, while still warm, can easily be cut with the shears or may be broken when cold and, as above described, may be applied by pressure to supports of any kind (Figs. 12 and 13). The manner according to which the pieces of tablet are laid in the press on the one hand and the nature or dimensions of the extrusion slot on the other hand have a profound effect on the pattern of the sheets obtained. It has been found to be particularly advantageous in this method to set the layers of the pieces of tablet to be pressed in such a manner that the extrusion slot is at right angles to both dimensions of the stratifications because in this case there is the least effacement of the desired stripy appearance.

The following examples illustrate the invention:—

*Example 1*

A straight walled, deep mold having a die of 2.5 sq. decimeters' surface, which fits it, is charged with a carbamide molding powder in the following manner: About 100 grams of molding powder of milky white, translucent appearance are irregularly distributed by spoonfuls over the bottom of the mold and on this layer there is strewn in similar manner about 60 grams of brown molding powder. This process of building up interrupted layers, is repeated until the mold is completely charged. The die is then put in place and the charge in the mold is pressed cold under a pressure of about 400 kilos per sq. cm. A hard tablet is thus obtained.

The tablet is sawn into thin plates at right angles to its stratification, that is to say parallel to the direction of the pressure. The individual plates which are now striped transversely to the direction of the layers are laid loosely side by side in a plate mold after being turned through an angle of 90° and the plate thus formed from the strips is pressed at about 140° C. under 130 kilos per sq. cm. for about 3 minutes. The carbamide plate thus produced has a brown and milk-white striped appearance, of an irregular bleeding character recalling the appearance of striped marble. Hitherto a design of this kind has only been obtained by a casting process.

Instead of sawing the tablets at right angles to the layers they may be sawn obliquely, preferably at a small angle to the direction of the layers. The strips of tablet thus obtained and pressed as above described yield plates of marbled character, in which the strata run obliquely; they have a beautiful clouded appearance.

A like appearance with oblique running strata can also be produced by charging the tablets not in layers which are substantially parallel to the bottom of the mold, but in layers which are slightly oblique to the bottom. These tablets are then sawn parallel to the bottom surface. By hot pressing the resultant sheets there are obtained without any loss of material, oblique, mottled, cloudy patterns.

*Example 2*

A bowl mottled like alabaster may be made in the following manner:—The desired pattern may show, for example, brown and black veins on a translucent yellowish ground.

In a tablet mold of the breadth of the desired bowl there is distributed in small irregular heaps the translucent yellowish molding powder. Then brown and black molding powders are alternately strewn between somewhat thick, cream colored layers in such a manner that it covers very thinly the light molding powder. This stratification is repeated to the desired thickness and the tablet is then pressed, at about 400-500 kilos per sq. cm., whereby it becomes hard and capable of being sawn.

This tablet is sawn in the direction at right angles to the layers and the strips are now turned through 90° and introduced into the pre-heated bowl mold (about 80-100° C.), so that the adjacent strips cover the mold in the form of one layer. In a few minutes the strips have become heated and so plastic that they take up the curved form of the wall of the mold. The mold is now closed by puting in place the preheated upper half of the die and by further heating to about 140° C. for a few minutes the regular hardening is effected. There is obtained a bowl of alabaster appearance of which the mottling layers are cut at the surface.

Instead of heating the cold pieces of tablet in the mold itself it is still better to preheat them by a preheating of about 80-100° C. for about a quarter of an hour and then to charge them quickly in plastic condition directly into the hot mold and compress them. By this mode of working a considerable amount of time may be spared, but more skill is required.

*Example 3*

Tubes and rods may be made in the following manner:—

First a striped tablet is molded as described in Example 1 or 2, this tablet being built up according to the desired pattern.

For making rods the tablet is sawn into rods of approximately square section. Long rods are advantageously cut in such manner that the square edges are partly removed, preferably the parallel sides of the layers being obliquely sawn away. In this manner they can be pressed horizontally into molds which consist of the two longitudinal halves of a rod. In the case of carbamide molding powder the pressure is usually about 50-100 kilos per sq. cm. at about 140° C. for a few minutes. Shorter, and in particular thick rods, can also be pressed upright. The rods obtained have an appearance of having been made by machining from striped marble or striped cast phenol or casein masses. Hitherto it has not been possible to make such rods from a molding powder.

In the manufacture of tubes the following procedure may be adopted:—The rods, sawn from the tablets in the manner described above, are longitudinally halved by sawing and these halves are compressed in the same rod mold with a suitable mandrel between them. After the compression the mandrel may be removed from the tube, preferably while it is still hot; the tubes thus obtained have a very beautiful marbled appearance, the stratification of which is at an angle to the surface and gives the impression of a material which has been made by machining from a solid block.

*Example 4*

As already described in Example 1, paragraphs 1 and 2, a tablet is made with substantially parallel stratification of its layers. This tablet is sawn at right angles to the stratification into pieces of 4.5 cm.×12 cm. These pieces are charged into a special press of rectangular cross section measuring 4.5 cm.×13 cm. and 12 cm. deep, in such a manner that they stand on edge and at right angles to the extrusion slot of the press. The form is now heated, preferably only at its bottom part. When the contents have become heated to about 70-100° C. pressure is applied to the press. The material, which must become soft and plastic, is now squeezed through the slot in the form of a soft sheet which gradually hardens as it cools in the air. This sheet can either be cut in its soft condition by means of shears or a knife or be broken when cold into pieces of suitable length.

The striped or mottled sheets can be made better if the cheeks of the discharge slot of the press are constructed so that they can be heated, the cross-section of a steam pipe passing through the cheeks of the discharge slot being shown at (24) (Fig. 11). It is then possible to make smoother and thinner sheets than when the bottom heating of the press is alone adopted.

An asbestos cement plate is painted with a carbamide-resin varnish and hardened. The plate thus prepared is now covered with one of the sheets described above and pressed between chromium plated brass plates in the hot press, the pressure being gradually applied from 4-5 minutes at 150° C. After cooling, the plate is removed from the press; it exhibits an irregularly striped, beautiful surface.

In order to more fully explain the invention we refer to the enclosed drawing wherein the single figures have the following signification:

Fig. 1 shows the arrangement of the different layers of molding powders of different colors in the tablet mold.

Fig. 2 shows the operation of pressing the thus arranged layers of molding powder to a horizontally stratified tablet (preform).

Fig. 3 represents such a stratified tablet or preform being cut into strips by a saw.

Fig. 4 shows an individual strip with the original arrangement of layers (horizontal).

Fig. 5 illustrates the position of the single strips side by side with the saw cut surfaces directed upwards and downwards after their rearrangement in a sheet mold before the pressing operation; note the vertical portion of the strata.

Fig. 6 shows a plate made by compression of the tablet pieces represented in Fig. 5; note that the strata in the sheet are again in vertical position.

Fig. 7 illustrates the transversal cut of a mold of a bowl opened and charged with narrow strips according to Fig. 4 turned through an angle of 90°; the strips are already softened by the heat of the mold and have therefore taken the shape of it.

Fig. 8 shows the result of molding the rearranged strips according to Fig. 7, viz. a bowl showing stripy decorations the layers of which are cutting the surface at an angle.

Fig. 9 illustrates a premolded thin sheet made according to Figs. 5 and 6 and a support with which it is to be united.

Fig 10 shows the composite sheet obtained by molding under heat and pressure the combination of Fig. 9; it represents a surface decorated support the layers of the decorations of which are cutting the surface at an angle.

Fig. 11 illustrates the producing of endless stripy thin sheets whose colored designs are cutting the surface at an angle. 20 illustrates the mold bearing at 21 a slot providing an opening at the bottom of one side of the mold. Into this mold strips (25) according to Fig. 4 are placed in such manner that both dimensions of the strata are forming a right angle with the extrusion slot; this latter advantageously may be heated by the steam channel (24). To the plunger (22) of the mold is then, after gently heating the mold from the bottom side pressure applied whereupon the plastic material inside the mold becomes soft and is extruded in form of the endless ribbon (23).

Fig. 12 shows how a piece of this ribbon which usually has a somewhat uneven wavy appearance is placed upon a support ready to be molded.

Fig. 13 illustrates the result of such molding operation, viz. a surface decorated support, similar to Fig. 10, the decorations of which are cutting the surface at an angle.

Fig. 14 illustrates how a strip according to Fig. 4 the edges of which have been broken, is placed in a rod mold.

Fig. 15 shows this rod mold in the closed position after pressure and heat have been applied; the strip has now taken the form of a rod the strata of which are running right through the body of the rod.

Fig. 16 illustrates the molding of a tube around a metal core which has been placed into a hole of the strip prepared according to Fig. 14.

Fig. 17 illustrates another method of molding a tube by placing a metal core between two narrow strips according to Fig. 4 and molding the same in a tube mold under heat and pressure.

Fig. 18 shows the result of the applied heat and pressure, viz. the plastic mass has flowed around the core and a tube is formed the stripy decorations of which are cutting the surface at an angle.

What we claim is:—

A method for the manufacture of irregularly patterned stratified molded bodies showing bleeding color effects from molding powders, said molded bodies having stratifications which cut the surface of the molded bodies at any desired angle, consisting in first producing from molding powders of the desired colors an irregularly stratified preform, cutting this preform in such a manner that its layers are intersected at an angle, placing the cut preform pieces in such manner into an extrusion press that the extrusion slot is at right angles with the stratifications of the preform pieces, heating the press, extruding the thus rearranged pieces from the hot extrusion press into the form of an elongated sheet, cutting the sheet, and finally subjecting the sheet thus cut to a hot pressing operation.

GUSTAVE WIDMER.
ALFRED JUCHLI.